July 5, 1927.

C. S. REIGER 1,634,684

TOGGLE MECHANISM

Filed May 15, 1923

INVENTOR.
Carl S. Reiger
By Newell & Spencer
Attorney

July 5, 1927.

C. S. REIGER 1,634,684

TOGGLE MECHANISM

Filed May 15, 1923

INVENTOR.
Carl S. Reiger
BY Newell + Spencer
ATTORNEYS

July 5, 1927. 1,634,684

C. S. REIGER

TOGGLE MECHANISM

Filed May 15, 1923 4 Sheets-Sheet 3

INVENTOR.
Carl S. Reiger
By Newell & Spencer
attorneys

July 5, 1927. 1,634,684
C. S. REIGER
TOGGLE MECHANISM
Filed May 15, 1923 4 Sheets-Sheet 4

INVENTOR.
Carl S. Reiger
By Newell & Spencer
Attorneys

Patented July 5, 1927.

1,634,684

UNITED STATES PATENT OFFICE.

CARL S. REIGER, OF ST. LOUIS, MISSOURI, ASSIGNOR TO BAKER PERKINS COMPANY, INC., OF SAGINAW, MICHIGAN, A CORPORATION OF NEW YORK.

TOGGLE MECHANISM.

Application filed May 15, 1923. Serial No. 639,078.

This invention relates to automatic weighing machines.

In delivering material to the weighing receptacle in machines of this type, the delivery of the material may be controlled by a shutter or valve. It is, of course, desirable that when a predetermined amount of material has been deposited in the receptacle, the valve should be quickly closed automatically. Any mechanism for causing the automatic closing of the valve should be as accurate and as sensitive as possible so that the weighing receptacle, when the valve is closed, will contain as nearly as possible the amount of material required as indicated by the weighing mechanism. It is also desirable that the extent to which the valve is open may be adjusted to regulate the flow of material from the delivering means into the receptacle.

The principal objects of the present invention are to improve the construction and mode of operation of automatic weighing mechanisms and to produce a mechanism of this type which has greater accuracy, sensitiveness and general efficiency than mechanisms of this character heretofore produced, and in which the rate of flow of material from the delivering means to the weighing mechanism may be regulated readily.

With these and other objects in view, the invention comprises the novel and improved features, constructions and combinations of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the constructions therein shown.

In the drawings—

Figure 1:
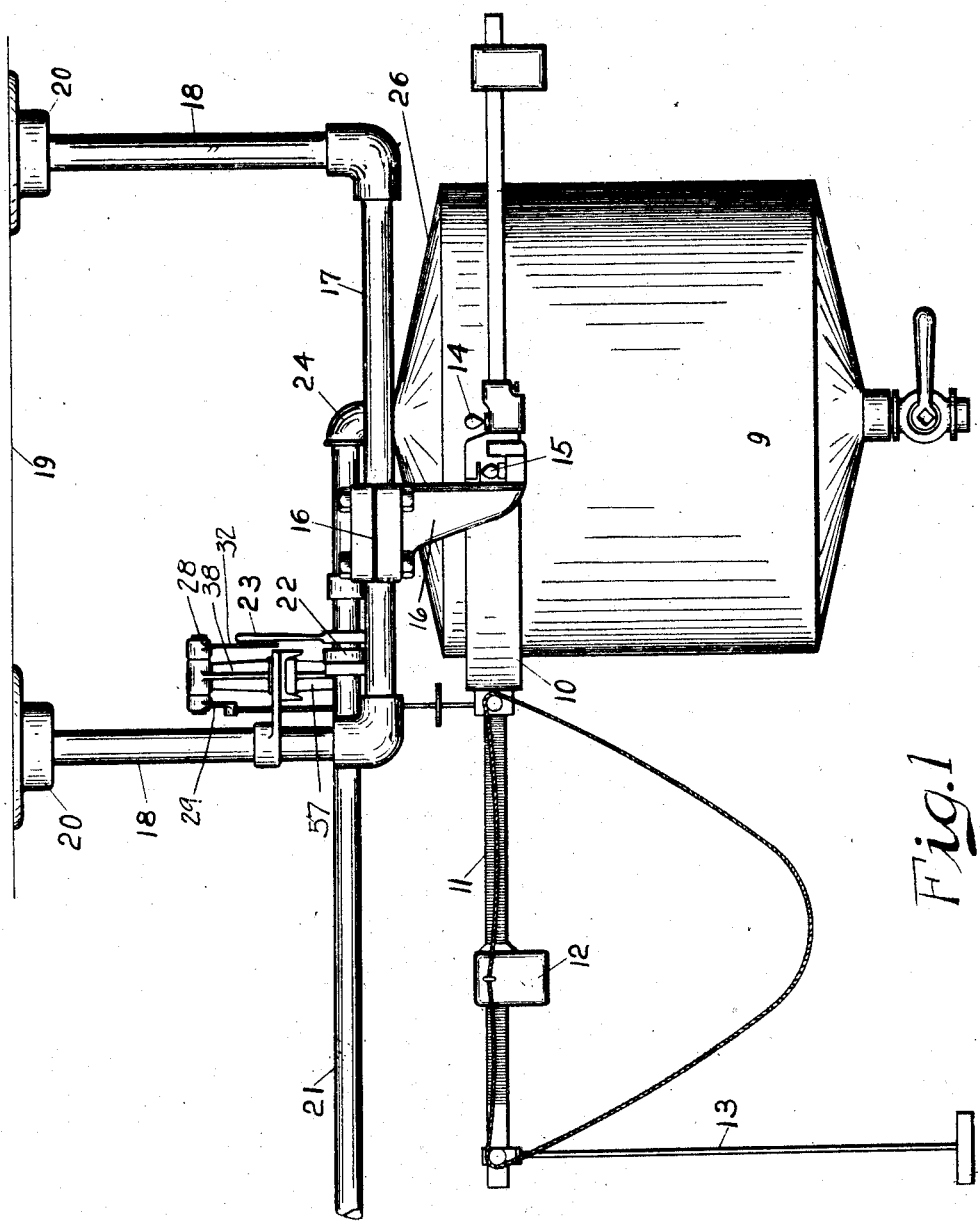
Figure 1 is a view in front elevation of an automatic weighing mechanism embodying the invention.

In the form of the invention illustrated in the drawings of this application, the mechanism comprises a weighing tank or receptacle indicated at 9, pivotally supported upon a scale beam 10 having a forked portion which embraces the weighing receptacle, and a graduated stem 11 upon which is mounted a sliding weight 12 and to which is attached a weight rod 13. The weighing receptacle is provided with studs 14, extending laterally therefrom, which rest upon suitable supports carried by the arms of the scale beam 10 to support the weighing receptacle. The arms of the scale beam are provided with corresponding studs 15 engaging suitable supports formed on brackets 16 attached to a suitable supporting frame. This frame comprises side members 17 and vertical members 18 to which are attached flange members or disks 20 by which the vertical members are secured to the ceiling 19 of the room in which the weighing mechanism is located.

In the preferred form of the invention, the weighing receptacle is supplied with liquid or other material to be weighed by means of a supply pipe 21, and the flow of material through this pipe is controlled by means of a suitable valve 22 to which is attached an operating arm 23. The supply pipe is formed with an outlet or nozzle 24 which engages in an opening 25 in the cover 26 of the weighing receptacle so as to deliver material into the receptacle.

Figure 2:
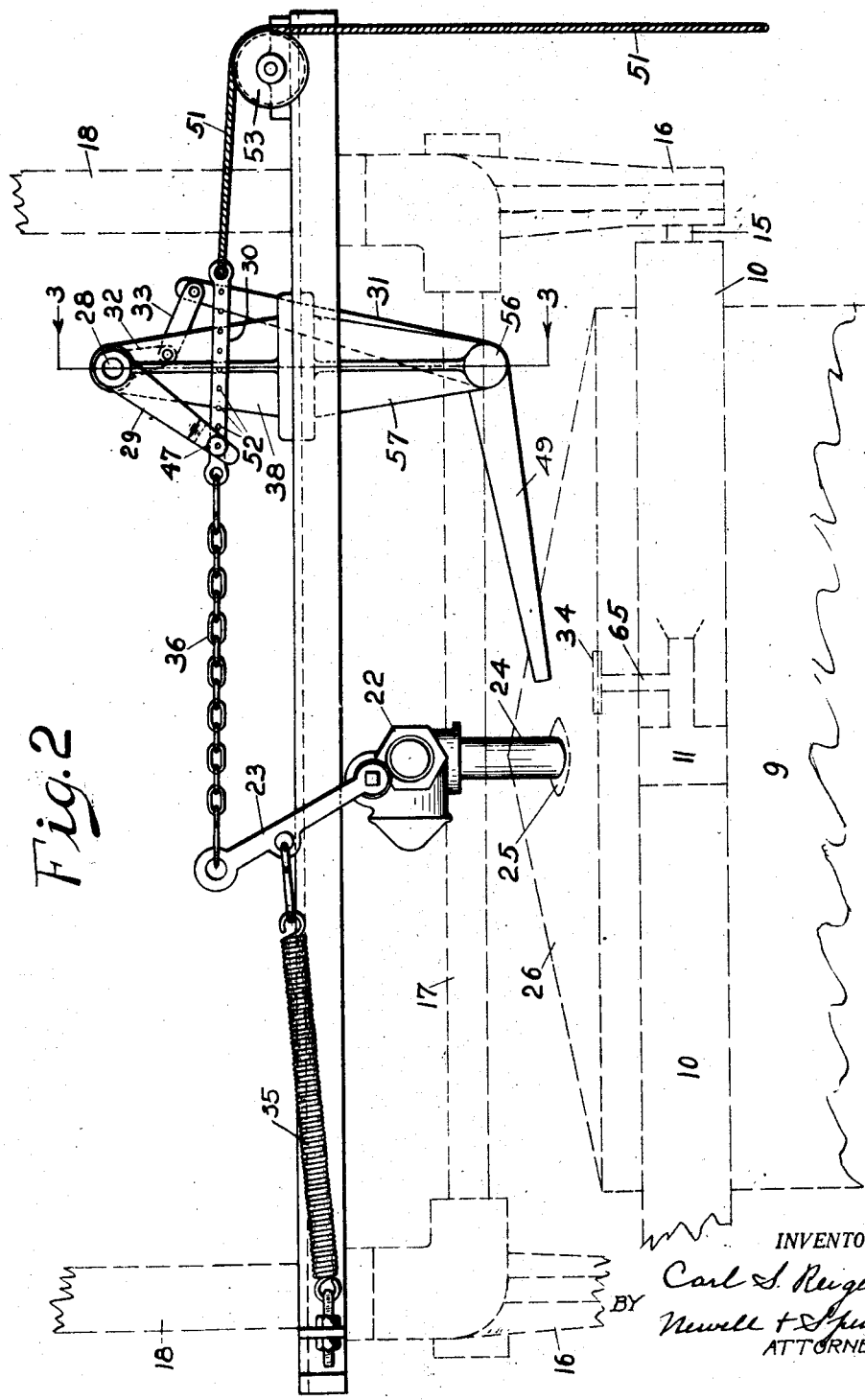
Fig. 2 is a view in side elevation illustrating in full lines the mechanism for controlling the valve of the material-delivering mechanism, and illustrating in dotted lines certain other parts of the mechanism shown in Fig. 1.
Figure 9:
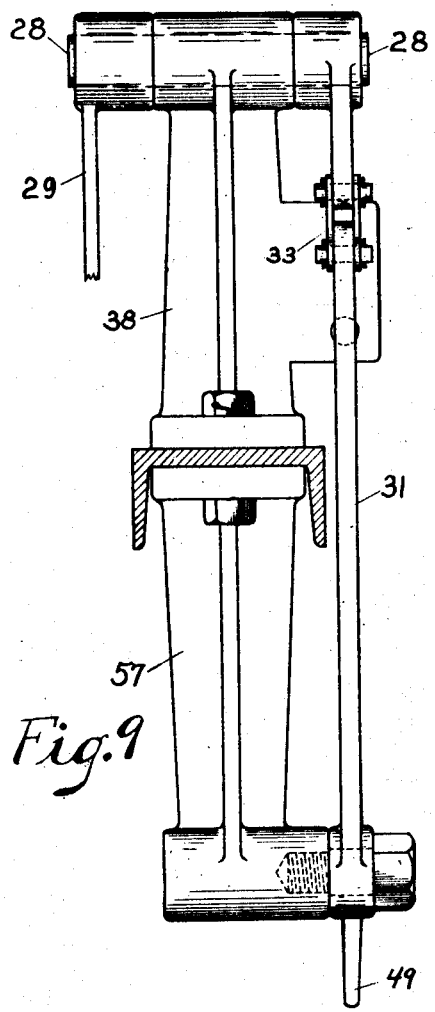
Fig. 9 is a view in side elevation looking from the right, Fig. 2, and illustrating certain parts of the valve controlling and operating mechanism.

The valve 22 is preferably opened manually to start a weighing operation, and is closed automatically when a predetermined weight of material has been deposited in the weighing receptacle. In the present form of the invention the mechanism for operating and controlling the valve comprises a toggle-mechanism connected with a rotatable shaft 28 mounted in a bracket 38 to one end of which shaft is attached an operating lever 29. To the lower end of the operating lever 29 is pivotally attached an adjusting bar 30 connected with the operating arm 23 of the valve by means of a chain 36. The operating arm 23 of the valve is acted upon by a coiled spring 35 which normally maintains the valve in closed position, as shown in Fig. 2. The operating arm 23 is swung in a direction to open the valve by means of a cord or rope 51 attached to one end of the adjusting bar 30 and passing over a pulley 53 mounted on the frame.

To the end of the shaft opposite that to which the lever 29 is attached is secured an arm 32 to which is connected the valve-controlling toggle. This toggle comprises an arm 31 pivoted at 56 upon a bracket 57, and a link 33 connecting the arm 31 with the arm 32. The arm 31 constitutes one arm of a bellcrank lever, the other arm of which, indicated at 49, extends into position to be engaged by a tripping disk 34 mounted on a bracket 65 secured to the scale beam 10.

Figure 5:
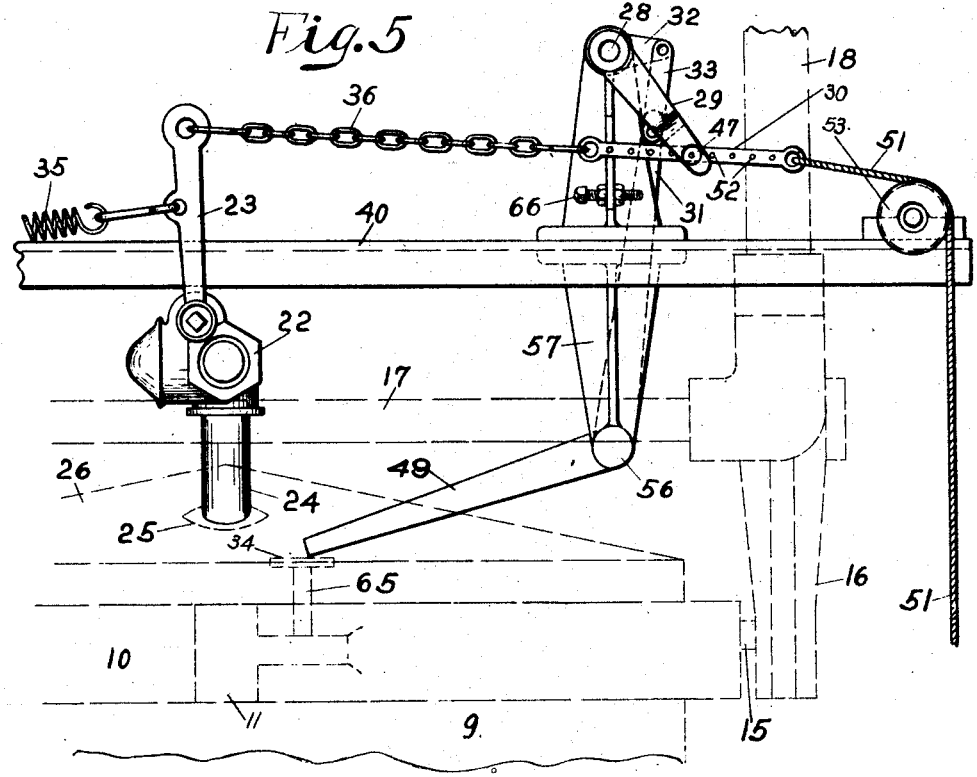
Fig. 5 is a view similar to Fig. 2, illustrating certain of the parts in different positions.
Figure 4:
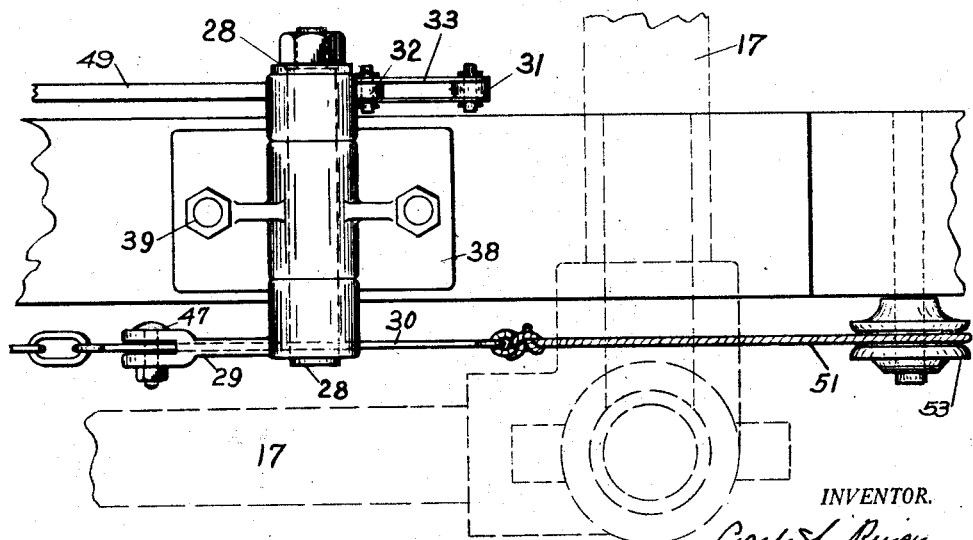
Fig. 4 is a plan view illustrating certain parts of the mechanism shown in Fig. 2.

When the toggle, consisting of the arm 31 and the link 33, is broken, the parts assume substantially the positions shown in Fig. 2, the valve then being held in closed position by the action of the spring 35. To open the valve and thereby start the weighing mechanism in operation, the operator grasps the cord 51 and pulls the same downwardly. This operation swings the operating lever 29, shaft 28 and the arm 32 in a direction to straighten the toggle, these parts assuming, at the conclusion of the operation, substantially the position shown in Fig. 5. The straightening movement of the toggle is limited by means of an abutment screw 66 adjustably mounted in the bracket 38 and arranged to engage the arm 31. This screw prevents the toggle from moving beyond a predetermined position during its straightening movement and through the adjustment enables the toggle mechanism to be set so that it is very sensitive in action. Upon the swinging of the toggle into straightened position in the manner described and the release of the cord 51 by the operator, the valve is locked in open position against the action of the spring 35 by the toggle.

When a predetermined amount of material has been deposited in the weighing receptacle, that part of the scale beam which carries the tripping disk 34 is elevated and the engagement of the disk with the arm 49 swings said arm and the arm 31 of the toggle in a direction to break the toggle. As soon as the toggle is broken to a slight degree, the valve is no longer locked against the action of the spring 35 and the spring operates to swing the operating arm 23 in a direction to close the valve, the parts being restored substantially to the position shown in Fig. 2 by the operation of the spring.

As stated above, it is desirable that the operator should be able to regulate the rapidity of flow of the material from the supply pipe into the weighing receptacle. This may be readily done in the present construction by adjusting the limiting open position of the valve 22. To enable the limiting open position of the valve to be readily adjusted, the adjusting bar 30 is provided with a series of openings 52 and the operating lever 29 is connected with the adjusting bar by means of a pin or bolt 47 which may be inserted in any one of the openings 52. Thus the point at which the operating lever 29 is connected to the adjusting bar 30 may be adjusted lengthwise of the bar. When it is desired that the valve shall be opened to its fullest extent by the operation of the cord 51 to straighten the toggle, the operating lever 29 is connected with the adjusting bar by inserting the pin 47 in the opening 52 in the bar nearest the left hand end of the bar as shown in Fig. 2. This adjustment of the mechanism will give the freest flow of the material through the delivery pipe into the weighing receptacle when the valve is open. When it is desired that the valve shall be only partially opened by the operation of the cord 51 to straighten the toggle, the operating lever 29 is connected with the adjusting bar 30 by inserting the pin 47 in one of the openings 52 nearer the right hand end of the bar, the extent to which the valve is opened being determined by the position lengthwise of the adjusting bar of the opening 52 in which the pin is inserted. Thus the extent to which the valve is opened may be readily regulated and the speed at which the material is delivered into the weighing receptacle may be easily controlled. This provision for adjustment of the mechanism for controlling the valve also enables the delivering means to be adjusted for liquids or other materials of different kinds.

The provision of the adjustable stop screw 66 enables the toggle mechanism to be set so that it is extremely sensitive and will be tripped upon the slightest upward movement of the tripping disk. Or if desired, the mechanism may be adjusted so that a considerable upward movement of the disk is required before the toggle mechanism is tripped.

Figures 7, 8:
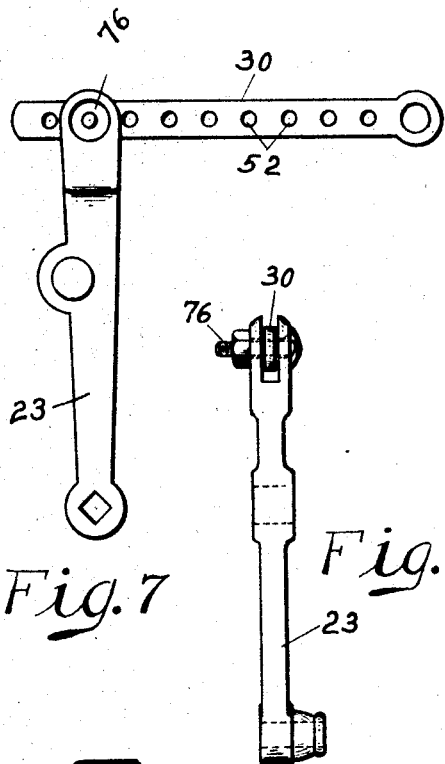
Figs. 6, 7 and 8 are detail views illustrating certain parts of the valve controlling and operating mechanism.
Figure 6:
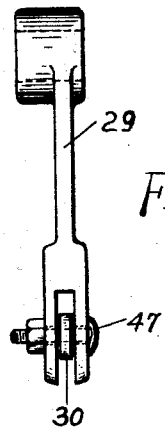
Figure 3:
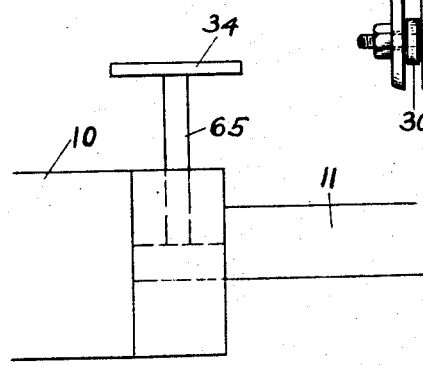
Fig. 3 is a detail view illustrating certain parts of the mechanism for tripping the valve-controlling means.

The adjusting bar 30, instead of being connected with the operating arm 23 by means of a chain, may be connected directly with the operating arm as shown in Fig. 7. As illustrated in this figure, the upper end of the operating arm embraces the adjusting bar and is connected with the adjusting bar by means of a pin or bolt 76.

The mechanism above described is comparatively simple in construction, is efficient and reliable in operation, and may be readily adjusted as desired.

It is to be understood that the invention is not limited to the particular construction and arrangement of parts of the illustrated embodiment of the invention, but that the invention may be embodied in other forms within the scope of the claims.

Having explained the nature and object of the invention and having specifically described a mechanism embodying the invention in its preferred form, what is claimed is:

1. An automatic weighing machine having, in combination, a weighing receptacle, means for movably supporting the receptacle, means for delivering material into the receptacle, a valve for controlling and cutting off the delivery of material, a toggle operating to lock the valve in open position when the toggle is straightened, a spring operating to close the valve when the toggle is broken, and means operating to initiate the breaking of the toggle when the weighing receptacle is depressed a predetermined amount comprising a lever connected to said toggle and tripping means for said lever adapted to contact therewith when said receptacle has been lowered the predetermined amount.

2. An automatic weighing machine having, in combination, a weighing receptacle, means for movably supporting the receptacle, means for delivering material into the receptacle, a valve for controlling and cutting off the delivery of the material by said delivering means, a toggle mounted independently of the receptacle, and means for controlling the closing of the valve from the toggle comprising adjustable means for determining the extent of the opening of the valve.

3. An automatic weighing machine having, in combination, a weighing receptacle, means for movably supporting the receptacle, means for delivering material into the receptacle, a valve for controlling and cutting off the delivery of material by said delivering means, a toggle and connections between the same and the valve for controlling the valve comprising adjustable means for determining the extent of the opening of the valve, means acting yieldingly on the valve and tending to close the same, the toggle operating to lock the valve in open position when the toggle is straightened, and means operating to initiate the breaking of the toggle when the weighing receptacle is depressed by the deposit of a predetermined amount of material therein.

4. An automatic weighing machine having, in combination, a weighing receptacle, means for movably supporting the weighing receptacle, means for delivering material into the receptacle, a valve for controlling and cutting off the delivery of material by said delivering means, mechanism for controlling and actuating the valve comprising a toggle and an adjusting bar arranged to be connected with the toggle at any one of a series of points in its length, connections between the adjusting bar and the valve, and means for limiting the movement of the toggle in the direction in which it is moved by the opening of the valve.

5. An automatic weighing machine having, in combination, a weighing receptacle, means for movably supporting the receptacle, means for delivering material into the receptacle, a valve for controlling and cutting off the delivery of material by said delivering means, means comprising a toggle for controlling the valve, an adjustable connection between the valve and the toggle, and means for limiting the movement of the toggle in the direction in which it is moved by the opening of the valve.

6. An automatic weighing machine having, in combination, a weighing receptacle, means for movably supporting the receptacle, means for delivering material into the receptacle, a valve for controlling and cutting off the delivery of material by said delivering means, means for controlling the valve comprising a toggle, connections between the toggle and the valve comprising an adjusting bar arranged to be connected with the toggle at any one of a series of points in its length, means connecting the adjusting bar with the valve, means for limiting the movement of the toggle in the direction in which it is moved upon opening the valve, means acting yieldingly on the valve and tending to close the valve, the toggle operating to lock the valve in open position when the toggle is straightened, and means operating to initiate the breaking of the toggle when the weighing receptacle is depressed by the deposit of a predetermined amount of material therein.

7. An automatic weighing machine having, in combination, a weighing receptacle, means for movably supporting the receptacle, means for delivering material into the receptacle, a valve for controlling and cutting off the delivery of material by said delivering means, a toggle for controlling the valve comprising a bellcrank lever, one arm of which forms one member of the toggle and the other constitutes a toggle-operating arm, a connection for holding the valve in open position while the toggle is straightened and for closing the valve when the toggle is broken, and means for operating the latter arm from the weighing receptacle to initiate the breaking of the toggle when a predetermined amount of material has been deposited in the receptacle.

8. An automatic weighing machine having, in combination, a weighing receptacle, means for movably supporting the receptacle, means for delivering material into the receptacle, a valve for controlling and cutting off the delivery of material by said delivering means, a spring for closing the valve, a toggle arranged to lock the valve in open position when the toggle is straightened and to allow the valve to be closed by the spring when the toggle is broken, an adjustable connection between the toggle and the valve, and means for breaking the toggle from the weighing receptacle when a predetermined amount of material has been deposited therein.

9. An automatic weighing machine having in combination a weighing receptacle, a pivoted scale beam for supporting the receptacle, means for delivering material into the receptacle, a rotary valve for controlling the delivery of material by said means, a valve operating arm attached to the valve, a spring acting on said arm and tending to maintain the valve in closed position, means for holding the valve in open position comprising a bell crank lever, a connection between one arm of the bell crank lever and the valve operating arm, a toggle, a connection between the other arm of the bell crank lever and the toggle, the valve being held in open position by the toggle when the toggle is straightened, a lever arm rigidly secured to one of the toggle members and means carried by the receptacle for engaging the latter arm to initiate the breaking of the toggle.

Signed at St. Louis, Missouri, this 1st day of May, 1923.

CARL S. REIGER.